Oct. 21, 1958        H. J. BYHRE        2,856,722
FISH RELEASED TRAP-HOOK
Filed Dec. 13, 1956
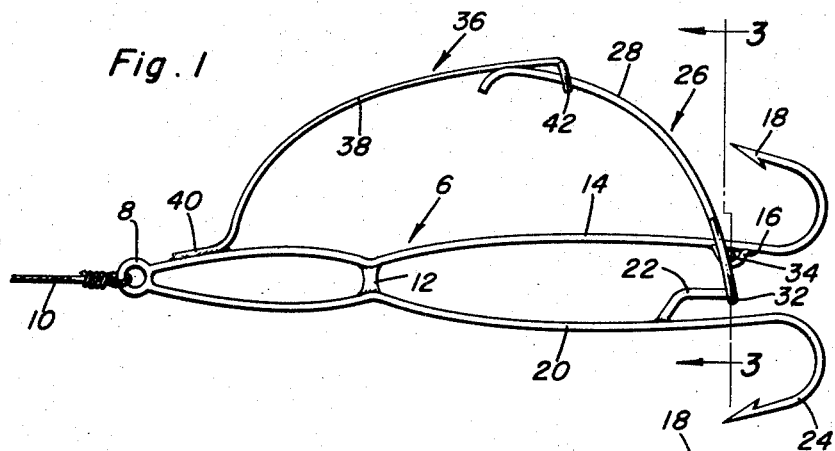
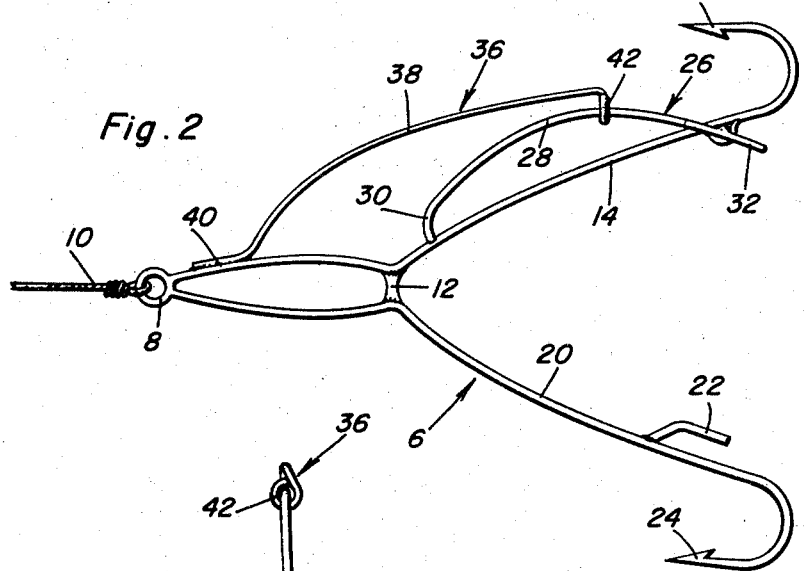
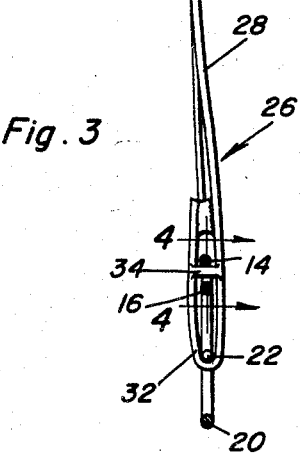
Henry J. Byhre
INVENTOR.

United States Patent Office 2,856,722
Patented Oct. 21, 1958

2,856,722
FISH RELEASED TRAP-HOOK

Henry J. Byhre, Park Falls, Wis.

Application December 13, 1956, Serial No. 628,198

3 Claims. (Cl. 43—36)

The present invention relates to an improved trap-hook which is characterized by a pair of opposed companion fishhooks which are mechanically latched together in close relationship when set and which automatically spring apart when a fish biting at the same releases a catch, in a generally well-known manner.

In carrying out a preferred embodiment of the invention the resilient shank of one fishhook is provided with a keeper hook with which a loop-like catch is temporarily engaged to thus set the hooks in their close together or ready-to-operate position. A spring on the other shank is operatively connected with a trigger and the trigger, in turn, is connected to the loop-like catch.

The invention also features a spring which is longitudinally bowed and which has an eye slidingly connected with an end portion of the trigger. The trigger is also bowed longitudinally and the loop-like catch is formed on one end thereof and hingedly mounted on the adjacent fishhook.

Features and advantages not specifically enumerated will become self-evident upon reading the specification in conjunction with the drawing.

In the drawing:

Fig. 1 is a side elevational view of an improved trap hook showing the same set and thus readied to make a catch;

Fig. 2 is a side elevation of the same showing the catch released and the fishhooks sprung apart in a manner to snag the victim fish;

Fig. 3 is a section on the line 3—3 of Fig. 1; and

Fig. 4 is a fragmentary view on an enlarged scale.

The principal unit is denoted by the numeral 6 and is characterized by a pair of resilient legs having their upper ends connected to an eye 8 to which the fishing line 10 is connected. Intermediate portions of the legs or limbs are joined together by a web or the like 12. The principal free end portions of the limbs are fashioned into a pair of coplanar fishhooks, the shank 14 of one hook having a loop-like member 16 connected to the inner side thereof inwardly of the barbed bend or hook 18. The shank of the companion hook, denoted at 20, is provided with a substantially hook-shaped member 22 constituting a keeper. Here the bend is fashioned into a barbed hook 24. So far as the unit 6 is concerned it is not unlike similarly constructed and performing trap-hooks.

As already mentioned the invention resides in the catch and trigger mechanism including the keeper 22 and the complemental eye 16. In this connection the trigger, as an entity, is denoted by the numeral 26 and comprises a longitudinally bowed wire member 28 having a laterally directed terminal 30 at one end forming a sort of a stop. The other end is bent upon itself and fashioned into a loop-like catch 32 which encircles the shank 14 and also the eye in the manner shown and which is provided with a cross-member 34 intermediate its ends and which is hingedly mounted in the eye 16 in the manner brought out in Fig. 4 in particular. It follows, therefore, that the hingedly mounted loop is at one end of the bowed wire 28 and the terminal bend 30 forming the shoulders at the other end. The loop forms a catch and is releasably engaged with a keeper 22 in the manner shown in Fig. 2.

When it is swung and moved to the required angle, that is, from the position of Fig. 1, it automatically releases the keeper and consequently the shanks 14 and 20 spread apart by reason of the inherent resiliency of the shanks themselves. To assist in insuring this releasing result and to make it more positive a longitudinally bowed spring 36 is provided. The spring 36 has one end welded or fixed to the unit 6 adjacent to the eye 8. The opposite end is free and is formed into a trip eye 42 which has the cooperating trigger slidingly saddled therein.

In practice the device is suitably baited, usually with worms or natural bait and then the twin hooks are set and latched in readiness for operation in the manner depicted in Fig. 1. When a victim fish strikes and bites the baited hooks, a slight movement of the hooks together assists in pivoting the loop-like catch 32 and it is consequently released from the keeper hook 22 and the two fishhooks are sprung forcibly apart causing the barbed hooks to embed themselves in the flesh of the fish's mouth, all in a generally well-known manner. It is to be noted that the sensitivity of operation of the catch is insured by the spring 36 which cooperates with and releases the trigger.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing device comprising a unit embodying a pair of coplanar cooperating fishhooks connected together and having means for attachment to a fishing line and having resilient shank portions provided with out-turned barbed hooks at their free ends, said fishhooks, by reason of said resilient shank portions being expansible and contractible, a keeper hook mounted on a median part of one shank portion, a catch embodying a loop embracing the other and cooperating shank portion and being hingedly mounted on said other shank portion, one end portion of said loop being engageable with said keeper hook and the opposite end portion being disposed outwardly of said other shank portion, and a spring-actuated trigger operatively cooperable with said catch.

2. The structure defined in claim 1 and wherein said trigger comprises a longitudinally bowed wire member having one end operatively connected with an adjacent end of said loop and its opposite end cooperative with the spring-actuating means.

3. A trap-type fishhook construction comprising a unit embodying a pair of companion fishhooks having interconnected resilient shanks, a keeper hook mounted on one shank, a loop-like eye fixedly mounted on the other shank, a loop embracing said eye and said last named shank and having a cross member hingedly mounted in said eye, trigger means connected with said loop to assist in tripping and releasing said loop, said trigger means comprising a longitudinally bowed wire member integral at one end with a loop and provided at its opposite end with a stop, and a longitudinally bowed spring having one end attached to the last mentioned shank and having an eye at its opposite end slidingly connected with said trigger.

References Cited in the file of this patent

UNITED STATES PATENTS

| | | |
|---|---|---|
| 595,691 | Bracklo | Dec. 21, 1897 |
| 684,211 | Ferch | Oct. 8, 1901 |
| 2,209,300 | Shipman | July 23, 1940 |
| 2,608,786 | Schwartz | Sept. 2, 1952 |
| 2,722,078 | Nikota | Nov. 1, 1955 |